US012734949B2

(12) United States Patent
Kadam et al.

(10) Patent No.: US 12,734,949 B2
(45) Date of Patent: Sep. 15, 2026

(54) RETRACTABLE ASSIST HANDLE ASSEMBLY FOR A VEHICLE

(71) Applicant: Ford Global Technologies, LLC, Dearborn, MI (US)

(72) Inventors: Mangesh Kadam, Canton, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 18/738,666

(22) Filed: Jun. 10, 2024

(65) Prior Publication Data

US 2025/0376100 A1 Dec. 11, 2025

(51) Int. Cl.

*B60N 3/02* (2006.01)
*B60R 13/02* (2006.01)
*B62D 25/04* (2006.01)

(52) U.S. Cl.

CPC ............ *B60N 3/023* (2013.01); *B60R 13/025* (2013.01); *B62D 25/04* (2013.01)

(58) Field of Classification Search

CPC ........ B60R 13/025; B62D 25/04; B60N 3/023
USPC ........................................................ 296/1.02
See application file for complete search history.

(56) References Cited

U.S. PATENT DOCUMENTS 6,431,643 B2 8/2002 Grey
7,631,915 B2 12/2009 Browne et al.
7,775,573 B2 8/2010 Lipke et al.
7,905,530 B2 3/2011 Browne et al.
10,829,023 B2 11/2020 Kadam et al.
11,351,901 B1 6/2022 Kozu et al.
2011/0221236 A1 9/2011 She
2020/0324678 A1* 10/2020 Kadam .................. B60R 21/02

FOREIGN PATENT DOCUMENTS

EP 1277647 A1 * 1/2003 ............ B62D 25/04

* cited by examiner

*Primary Examiner* — Caroline N Butcher
(74) *Attorney, Agent, or Firm* — Vichit Chea; Price Heneveld LLP

(57) ABSTRACT

A vehicle assist handle assembly includes a support structure. A releasable connector is coupled to the support structure. The assist handle support structure has a first end and a second end. The first end has a pivot connector that connects the first end to the support structure and allows the first end to rotate about a pivot axis. The second end is coupled to the releasable connector to connect the second end to the support structure in a use position and is releasable to release the second end. A spring biases the assist handle towards the retracted position. An actuator is configured to release the releasable connector to allow the second end to rotate about the first end to the retracted position.

17 Claims, 4 Drawing Sheets

RETRACTABLE ASSIST HANDLE ASSEMBLY FOR A VEHICLE

FIELD OF THE DISCLOSURE

The present disclosure generally relates to motor vehicles having assist handles, and more particularly relates to a vehicle assist handle assembly configured to rotate from a use position to a retracted position.

BACKGROUND OF THE DISCLOSURE

Motor vehicles are commonly equipped with assist handles. Assist handles are often positioned proximate to a door opening, such as on a support pillar and the overlaying trim panel attached to the support pillar. The assist handle is typically positioned to assist a user to access or exit the vehicle. It may be desirable to provide for an assist handle that may rotate to a retracted position in certain circumstances.

SUMMARY OF THE DISCLOSURE

According to a first aspect of the present disclosure, a vehicle assist handle assembly includes a support structure. A releasable connector is coupled to the support structure. The assist handle support structure has a first end and a second end. The first end has a pivot connector that connects the first end to the support structure and allows the first end to rotate about a pivot axis. The second end is coupled to the releasable connector to connect the second end to the support structure in a use position and is releasable to release the second end. A spring biases the assist handle towards the retracted position. An actuator is configured to release the releasable connector to allow the second end to rotate about the first end to the retracted position.

Embodiments of the first aspect of the present disclosure can include any one or a combination of the following features:

- a controller configured to control the actuator to release the release mechanism in response to detecting a vehicle impact;
- the vehicle impact detection is the detection of an angular impact to the vehicle;
- the support structure comprises a support pillar;
- the support pillar comprises a support beam covered with a vehicle interior trim panel;
- the assist handle is connected to a bracket on the support beam;
- the pivot axis is perpendicular to a longitudinal axis of the assist handle;
- the second end is an upper end in the use position of the assist handle;
- the upper end rotates downward below the first end in the retracted position;
- the actuator comprises a solenoid; and
- the releasable connector comprises a pin configured to engage the support structure.

According to a second aspect of the present disclosure, a vehicle assist handle assembly includes a support structure comprising a support pillar. A releasable connector is coupled to the support pillar. An assist handle is supported on the support pillar and has a first end and a second end. The first end has a pivot connector that connects the first end to the support pillar and allows the first end to rotate about a pivot axis that is perpendicular to a handle axis of the assist handle. The second end is coupled to the releasable connector to connect the second end to the support pillar in a use position and is releasable to release the second end. A spring biases the assist handle towards the retracted position. An actuator is configured to release the releasable connector to allow the second end to rotate about the first end to the retracted position. A controller is configured to control the actuator to release the releasable connector in response to detection of a vehicle impact.

Embodiments of the second aspect of the present disclosure can include any one or a combination of the following features:

- the vehicle impact is angular vehicle impact;
- the support pillar comprises a support beam;
- the assist handle is connected to a bracket supported by the support beam;
- the support structure comprises a vehicle interior trim panel covering the support pillar;
- the second end is an upper end in the use position of the assist handle;
- the upper end rotates downward below the first end in the retracted position;
- the actuator comprises a solenoid; and
- the releasable connector comprises a pin configured to engage the support pillar.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
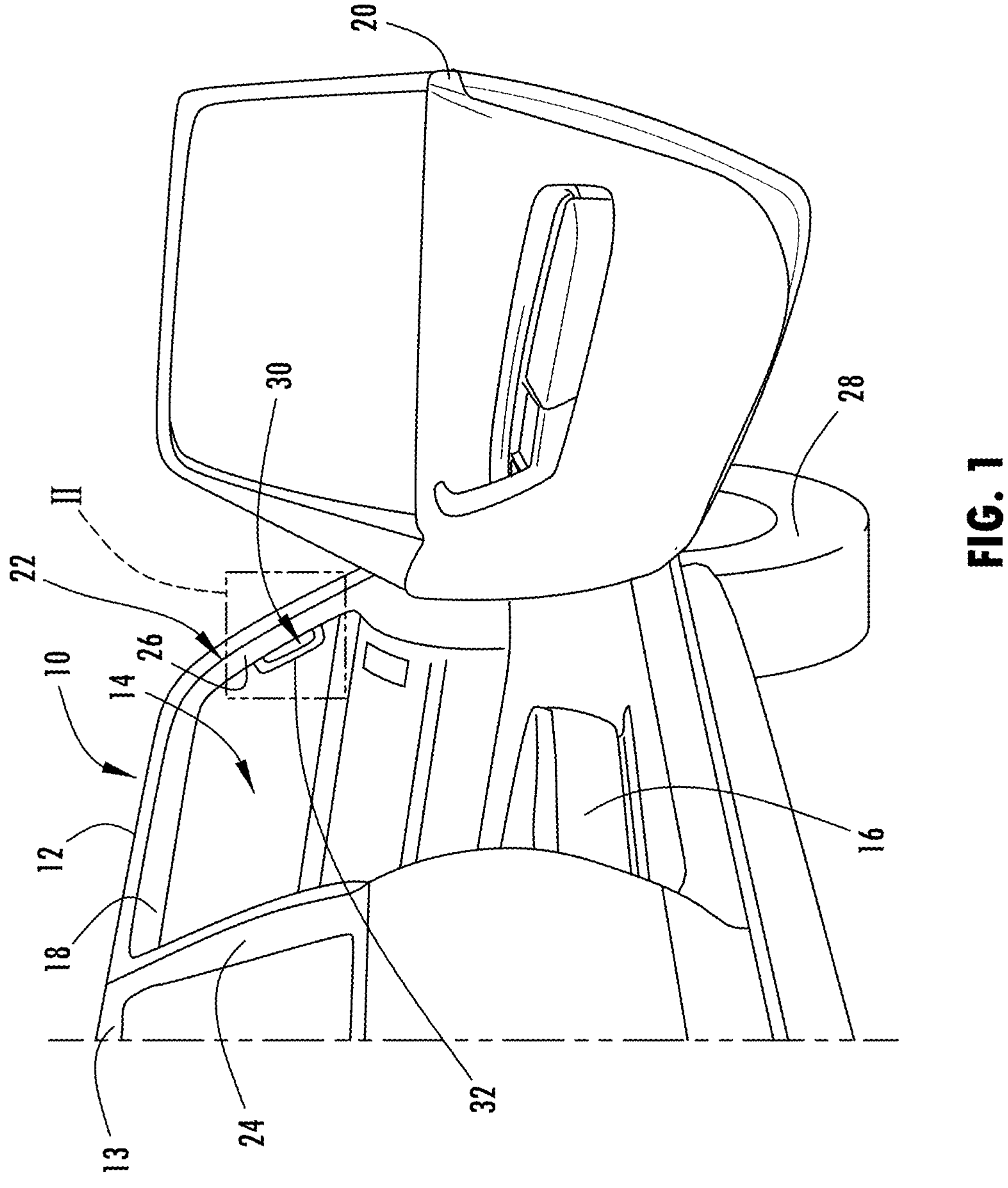
FIG. 1 is a side perspective view of a motor vehicle having an assist handle assembly located on a front support pillar in the vehicle interior, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle assist handle assembly having a retractable assist handle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a vehicle assist handle assembly 30 is illustrated assembled in the interior of a motor vehicle 10 having an underlying rigid structural support body in the form of a support pillar 22 of the motor vehicle 10. The assist handle assembly 30 has an assist handle 32 with a shape and size generally configured to be gripped by a user's hand. The assist handle assembly 30 is configured to secure the assist handle 32 to the structural support in the interior of the motor vehicle 10 in a structurally supported normal use position and to retract to a retracted position when a potential impact to the vehicle is detected.

The motor vehicle 10 is generally illustrated in one exemplary embodiment equipped with the assist handle assembly 30 assembled within the interior of the motor vehicle on a support pillar generally proximate to and forward of a seat 16 configured to hold a passenger, for example. The support pillar is shown in one example as a front cabin support pillar 22 that generally extends along a vertical incline and defines a front portion of a door opening 18. According to other examples, the support beam may be a middle cabin support beam 24 or other rearward located support beams. The door opening 18 is configured to receive a door 20 in the closed door position. The front support pillar generally extends from a lower frame structure upwards to a roof 12. When a passenger is seated on seat 16, the passenger may reach with an arm and hand forward to grip the assist handle 32 generally forward and towards the side of the passenger seat 16.

The motor vehicle 10 may be, for example, an off-road style wheeled motor vehicle. The motor vehicle 10 generally includes a plurality of road wheels 28 and a vehicle body 13 generally defining the passenger compartment 14 in the interior. While a wheeled motor vehicle 10 is generally shown and described herein, it should be appreciated that other vehicles such as boats, trains, planes and other vehicle may be equipped with the assist handle assembly 30. It should be further appreciated that multiple assist handles may be located at various locations on the motor vehicle 10 supported on a support structure and retractable between a normal use position and a retracted position.

Figure 3:
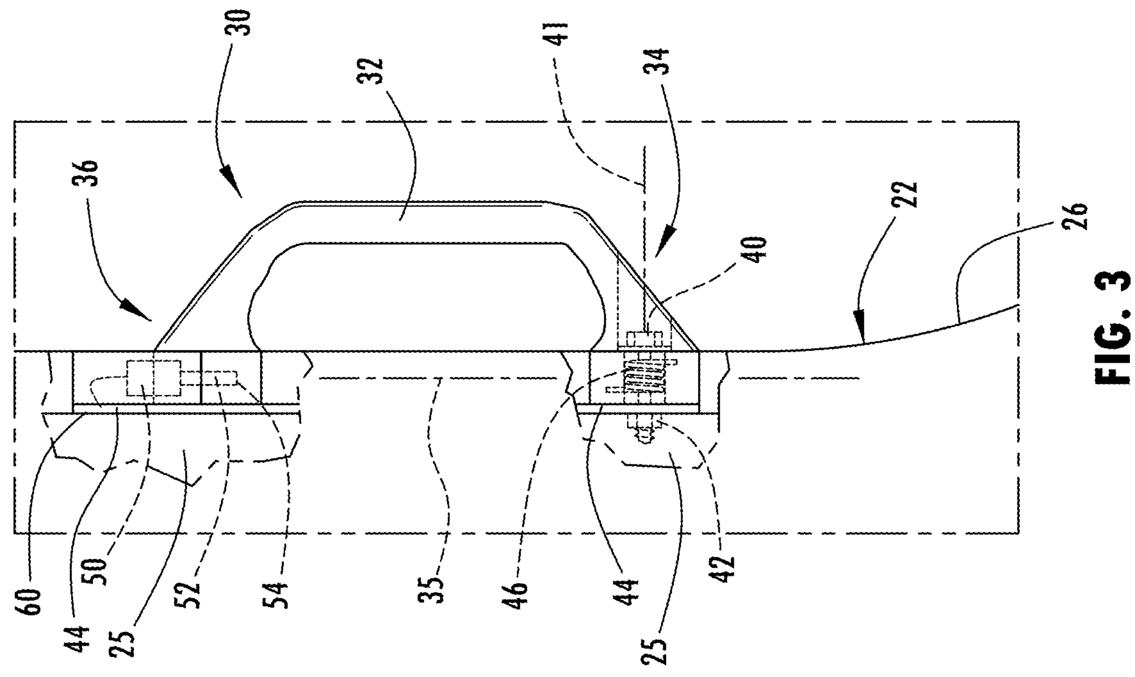
FIG. 3 is a side partial breakaway view of the assist handle assembly shown in the use position.

The front support pillar 22 generally includes an underlying structural support shown in FIG. 3 having a steel beam 25 and an overlaying trim panel 26. The assist handle 32 is shown assembled onto the support beam 25 via a steel bracket 44 such that the assist handle 32 and the overlaying trim panel 26 may be assembled as a unit onto the underlying steel beam 25. The trim panel 26 thereby covers the steel beam 25 to provide an aesthetically pleasing interior surface.

Figure 2:
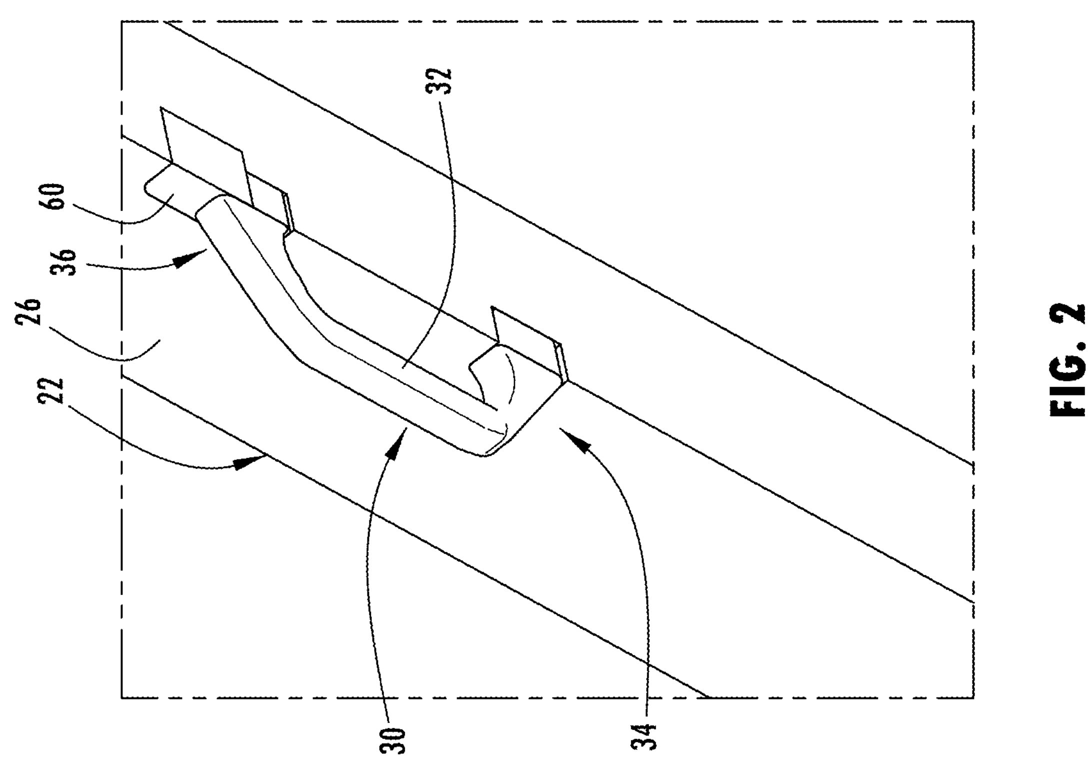
FIG. 2 is an enlarged perspective view of section II of FIG. 1 further illustrating the assist handle assembly assembled onto the front support pillar in a use position.
Figure 5:
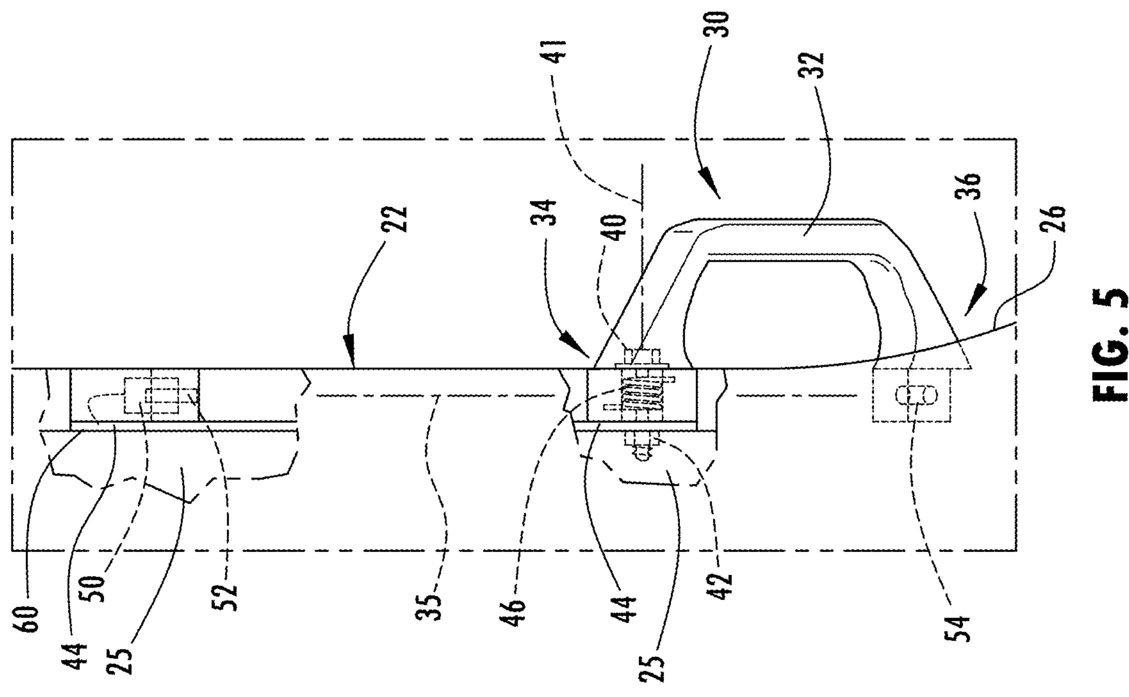
FIG. 5 is a side partial breakaway view of the assist handle assembly shown further in the retracted position.
Figure 4:
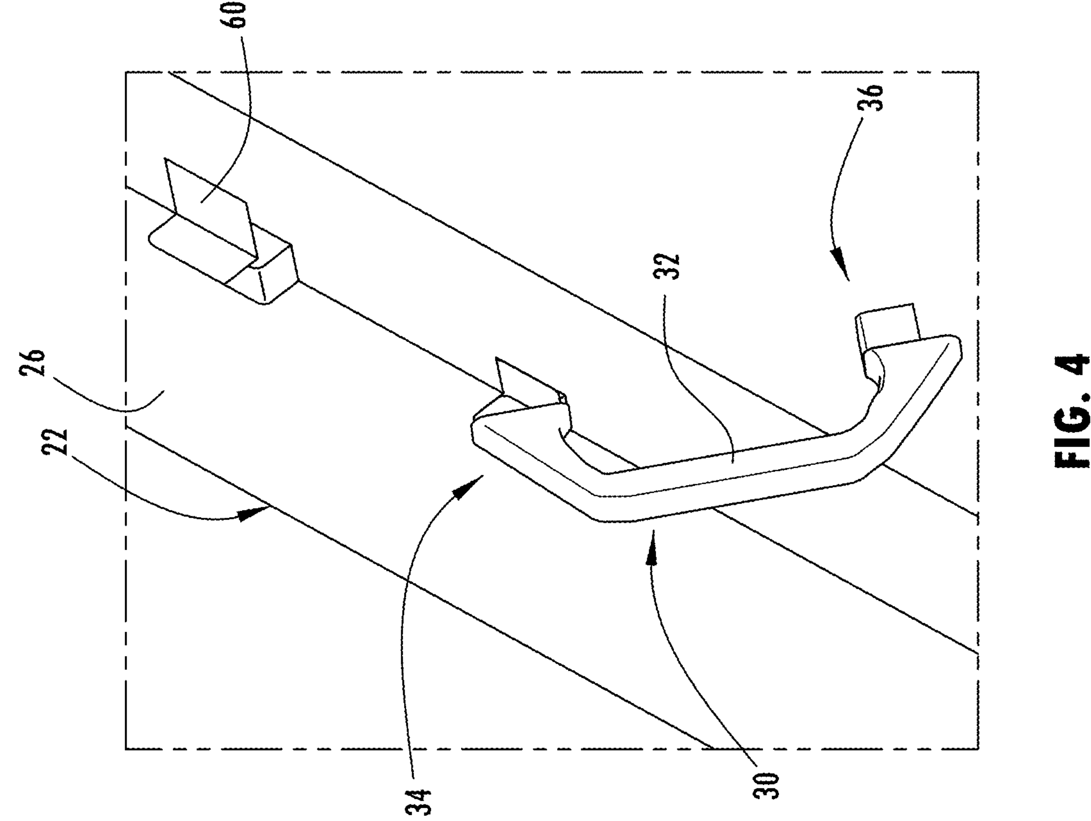
FIG. 4 is a perspective view of the assist handle assembly shown related to a retracted position.

The assist handle 30 is shown in FIGS. 2 and 3 in a normal use position configured for convenient engagement by a hand of a user. The assist handle 30 is configured to retract from the use position to a retracted position as seen in FIGS. 4 and 5 when an impact of the motor vehicle 10 is detected, such as the detection of an angular impact. The assist handle 32 is a handle body that is generally configured to be gripped by a user's hand. The assist handle 32 also includes a first end 34 and an opposite a second end 36. The assist handle 32 generally extends along a longitudinal axis 35 extending between the first end 34 and the second end 36 of the assist handle 32. The first end 34 is connected to the support beam 25 via a pivot connector 40 which may be configured as a bolt threadedly connected to a nut 42, a pin or other fastener that connects the first end 34 to first bracket 44 on the steel beam 25 and allows the assist handle 32 to rotate about the pivot connector 40 to move from the normal use position to the retracted position. The pivot connector 40 is arranged to pivot the assist handle 32 about a pivot axis 41. The pivot axis 41 is perpendicular to the longitudinal axis 35 of the assist handle 32. The pivot connector 40 may be connected to the bracket 44 on the internal support beam 25 within the trim panel 26. The first end 34 of the assist handle assembly 30 also includes a torsion spring 46 operatively coupled to the pivot connector 40 and the bracket 44 for biasing the handle body 32 with a spring bias force to force the handle body 32 to rotate from the use position towards the retracted position.

The assist handle assembly 30 includes a releasable connector in the form of a pin 52 connected to an actuator 50 that is actuated to move the pin 52 between an extended position and a retracted position. The actuator 50 and pin 52 are coupled to the bracket 44 and thereby are supported by the support beam 25. The pin 52 is configured to engage within an opening 54 in a structure of the assist handle 32 at the second end 36 while connected in the use position. When a potential vehicle impact is detected, including detection of a potential angular impact of the motor vehicle 10, the actuator 50 actuates the pin 52 to a retracted position to remove the pin 52 from the opening 54 to thereby allow the second end 36 of the assist handle 32 to be released from the support structure. Release of the pin 52 from the opening 54 allows the second end 36 of the handle body 32 to be rotated by the spring bias force of the torsion spring 46 vehicle rearward to the retracted position where the second end 36 is lower than the first end 34. According to another embodiment, the assist handle 32 may be actuated with a spring bias vehicle forward to rotate the second end 36 to the lower position. With the second end 36 of the assist handle body 32 in the retracted position, the handle body 32 is less likely to contact a user during a vehicle impact event.

To allow the second end 36 of the handle body 32 to disengage from the support structure and freely rotate when the pin 52 is retracted, a recess 60 may be provided on one side of the trim panel 26. As such, the second end 36 of the handle body 32 is free to rotate from the use position to the retracted position by passing through the recess 60 with no or little interference.

According to one example, the actuator 50 may include a solenoid that is electronically powered and controlled, and the release mechanism may include the pin 52 configured to engage the opening 54 in the second end 36 of the assist handle 32. According to another example, the actuator 50 may include a pyrotechnic actuator for retracting the pin 52 from opening 54 or shearing the pin 52.

Figure 6:
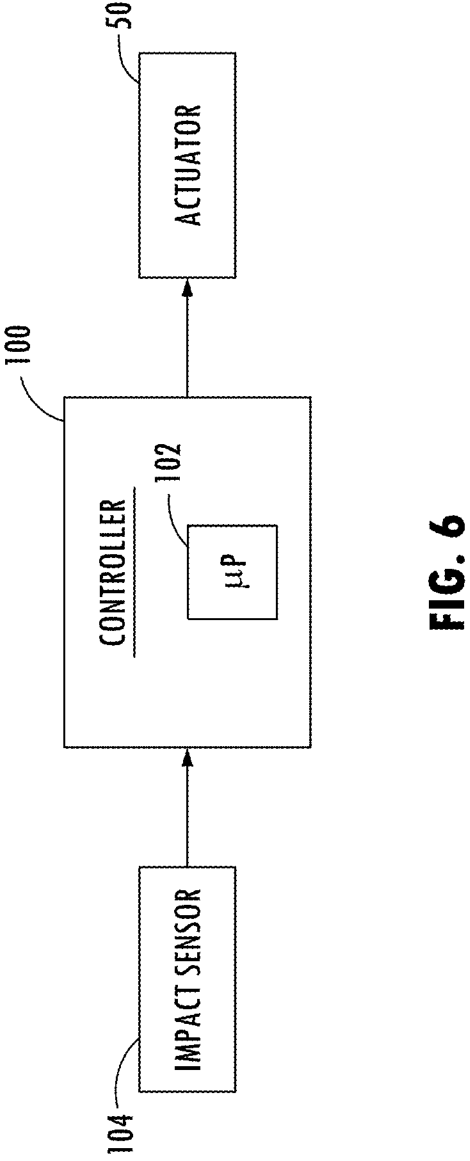
FIG. 6 is a block diagram illustrating a controller for controlling actuation of the assist handle assembly to the retracted position, according to one example.

Referring to FIG. 6, the actuator 50 may be controlled by a controller 100 onboard the motor vehicle 10. The controller 100 may include a microprocessor 102 controller or other analog and/or digital circuitry. The controller 100 may be a restraint control module, for example, and may be in communication with and may control various devices onboard the motor vehicle 10. The controller 100 may transmit and receive data through a communication network such as a controller area network (CAN) bus, or other wired or wireless communication. The controller 100 may communicate with one or more impact sensors 104 via the communication network. The impact sensor 104 is adapted to detect an impact, including a potential impact such as an angular impact, to the motor vehicle 10 and generates an impact detection signal. The angular impact may include an impact with an object that is not aligned with the longitudinal axis of the motor vehicle 10, such that lateral forces may be realized. The impact sensor 104 may be of any suitable type, for example, post-contact sensors such as linear or angular accelerometers, gyroscopes, pressure sensors and contact switches, and pre-impact sensors such as radar, lidar and vision-sensing systems. It should be appreciated that the impact sensor 104 may be located at numerous locations in or on the motor vehicle 10. Upon detecting a potential vehicle impact, the controller 100 may actuate the actuator 50 to allow the assist handle 32 to rotate from the use position to the retracted position.

Accordingly, a vehicle assist handle assembly 30 is advantageously provided with an assist handle 32 supported on a support structure on the motor vehicle 10, in which the assist handle 32 may be rotated from a use position to a retracted position upon detection of a vehicle impact event. This may advantageously minimize passenger contact with the assist handle 32 during an impact event.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle assist handle assembly comprising:
- a support structure;
- a releasable connector coupled to the support structure;
- an assist handle supported on the support structure and having a first end and a second end, wherein the first end has a pivot connector that connects the first end to the support structure and allows the first end to rotate about a pivot axis which is perpendicular to a longitudinal axis of the assist handle, and wherein the second end is coupled to the releasable connector to connect the second end to the support structure in a use position and is releasable to release the second end;
- a spring biasing the assist handle towards a retracted position; and
- an actuator configured to release the releasable connector to allow the second end to rotate about the first end to the retracted position.

2. The vehicle assist handle assembly of claim 1, further comprising a controller configured to control the actuator to release the release mechanism in response to detecting a vehicle impact.

3. The vehicle assist handle assembly of claim 2, wherein the vehicle impact detection is the detection of an angular impact to the vehicle.

4. The vehicle assist handle assembly of claim 1, wherein the support structure comprises a support pillar.

5. The vehicle assist handle assembly of claim 4, wherein the support pillar comprises a support beam covered with a vehicle interior trim panel.

6. The vehicle assist handle assembly of claim 5, wherein the assist handle is connected to a bracket on the support beam.

7. The vehicle assist handle assembly of claim 1, wherein the second end is an upper end in the use position of the assist handle.

8. A vehicle assist handle assembly comprising:

a support structure;

a releasable connector coupled to the support structure;

an assist handle supported on the support structure and having a first end and a second end, wherein the first end has a pivot connector that connects the first end to the support structure and allows the first end to rotate about a pivot axis, and wherein the second end is coupled to the releasable connector to connect the second end to the support structure in a use position and is releasable to release the second end, wherein the second end is an upper end in the use position of the assist handle;

a spring biasing the assist handle towards a retracted position; and an actuator configured to release the releasable connector to allow the second end to rotate about the first end to the retracted position, wherein the upper end rotates downward below the first end in the retracted position.

9. The vehicle assist handle assembly of claim 8, wherein the actuator comprises a solenoid.

10. The vehicle assist handle assembly of claim 9, wherein the releasable connector comprises a pin configured to engage the support structure.

11. A vehicle assist handle assembly comprising:

a support structure comprising a support pillar;

a releasable connector coupled to the support pillar;

an assist handle supported on the support pillar and having a first end and a second end, wherein the first end has a pivot connector that connects the first end to the support pillar and allows the first end to rotate about a pivot axis that is perpendicular to a longitudinal axis of the assist handle, and wherein the second end is coupled to the releasable connector to connect the second end to the support pillar in a use position and is releasable to release the second end;

a spring biasing the assist handle towards a retracted position;

an actuator configured to release the releasable connector to allow the second end to rotate about the first end to the retracted position, wherein the second end is an upper end in the use position of the assist handle, and wherein the upper end rotates downward below the first end in the retracted position; and a controller configured to control the actuator to release the releasable connector in response to detection of a vehicle impact.

12. The vehicle assist handle assembly of claim 11, wherein the vehicle impact is an angular vehicle impact.

13. The vehicle assist handle assembly of claim 11, wherein the support pillar comprises a support beam.

14. The vehicle assist handle assembly of claim 13, wherein the assist handle is connected to a bracket supported by the support beam.

15. The vehicle assist handle assembly of claim 14, wherein the support structure comprises a vehicle interior trim panel covering the support pillar.

16. The vehicle assist handle assembly of claim 11, wherein the actuator comprises a solenoid.

17. The vehicle assist handle assembly of claim 11, wherein the releasable connector comprises a pin configured to engage the support pillar.

* * * * *